United States Patent [19]

Kanai

[11] Patent Number: 5,080,417
[45] Date of Patent: Jan. 14, 1992

[54] PARTITION PLATE FOR AUTOMOTIVE VEHICLE

[75] Inventor: Yoshifumi Kanai, Kanagawa, Japan
[73] Assignee: Ikeda Bussan Co., Ltd., Ayase, Japan
[21] Appl. No.: 618,926
[22] Filed: Nov. 28, 1990

[30] Foreign Application Priority Data

Mar. 22, 1990 [JP] Japan ............... 2-29273[U]

[51] Int. Cl.⁵ .............................................. B62D 43/00
[52] U.S. Cl. ................................ 296/37.3; 296/37.14
[58] Field of Search ................... 296/37.2, 37.3, 37.14, 296/37.16; 108/27, 125; 292/262, 263; 220/335, 336

[56] References Cited

U.S. PATENT DOCUMENTS

| | | | |
|---|---|---|---|
| 2,117,239 | 5/1938 | Buechler | 108/125 |
| 3,117,689 | 1/1964 | Dedic, Sr. | 292/262 X |
| 3,338,620 | 8/1967 | Cauvin | 296/37.2 X |
| 3,418,740 | 12/1968 | Gray | 292/262 X |
| 3,476,432 | 11/1969 | Aliment et al. | 296/37.16 X |
| 4,226,461 | 10/1980 | Ackel | 296/37.16 X |
| 4,443,034 | 4/1984 | Beggs | 296/37.16 X |
| 4,811,440 | 3/1989 | Scott | 292/262 X |
| 4,962,709 | 10/1990 | Huber | 108/27 X |
| 4,991,898 | 2/1991 | Nomura | 296/37.3 X |

FOREIGN PATENT DOCUMENTS

| 1029467 | 6/1953 | France | 296/37.2 |
| 135347 | 7/1985 | Japan | 296/37.3 |

Primary Examiner—Margaret A. Focarino
Assistant Examiner—Joseph D. Pape
Attorney, Agent, or Firm—Foley & Lardner

[57] ABSTRACT

A partition plate for use in a luggage compartment of an automotive vehicle. The partition plate is detachable from the automotive vehicle and serves as a table of a reversible type in the outdoors. The partition plate comprises a board whose one surface is covered with a carpet. The peripheral section of the carpet extends to a side peripheral surface of the partition plate and is covered with a garnish secured on the other surface of partition plate. The garnish is provided with a supporting rod by which the partition plate is supported to be kept under an opened condition in the luggage compartment.

21 Claims, 5 Drawing Sheets

PARTITION PLATE FOR AUTOMOTIVE VEHICLE

BACKGROUND OF THE INVENTION

1. Field of the Invention

The present invention relates to improvements in a partition plate which is used to divide a luggage compartment of an automotive vehicle into a main compartment and a sub-compartment storing a spare tire or the like.

2. Description of the Prior Art

It is well known that a partition plate for dividing a luggage compartment is used in an automotive vehicle. Since such a partition plate has a relatively large flat surface and is detachable so as to be removable from the luggage compartment, it has been proposed to use the partition plate as a table in the outdoors after being removed from the luggage compartment.

An example of such a conventional partition plate is shown in FIG. 9 of the present application, in which a partition plate 6 is detachably installed on a luggage floor 4 of a luggage compartment. A sub-compartment 5 over which the partition plate 6 is disposed is formed under the luggage floor 4.

The partition plate 6 is tightly provided with a carpet 8 by use of an adhesive or the like and fitted on an upper opening step section 5a of the sub-compartment 5.

The partition plate 6 includes a board 7 made of plastic and formed with a hollow space therein so that the partition plate 6 is light in weight.

SUMMARY OF THE INVENTION

The present invention comprises a board having first and second surfaces which are opposite to each other. A trim member is secured to the board first surface. A garnish is secured to the board second surface. The garnish covers a peripheral section of the trim member and has a section defining a groove. At least one supporting rod has a first end pivotally connected to a section of the garnish and is retractable into the garnish groove.

With this arrangement, the partition plate can be supported by the supporting rod so as to maintain the partition an opened condition, so that a spare tire and-/or the like in the sub-space can be removed without detaching the partition plate. Additionally, when the partition plate is used as a table in the outdoors upon being detached from the automotive vehicle, the supporting rods installed at respective corners of the partition plate serves as legs by which the table is supported.

BRIEF DESCRIPTION OF THE DRAWING

In the drawings, like reference numerals designate like elements and parts throughout the figures, in which.

DETAILED DESCRIPTION OF THE INVENTION

Figure 1:
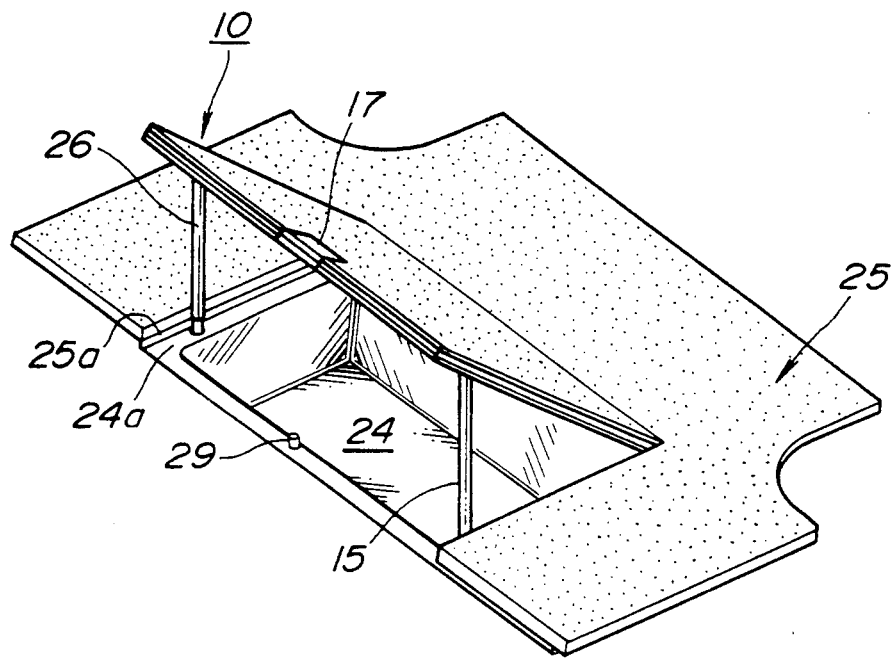
FIG. 1 is a perspective view of a first embodiment of a partition plate according to the present invention and a luggage floor.
Figure 2:
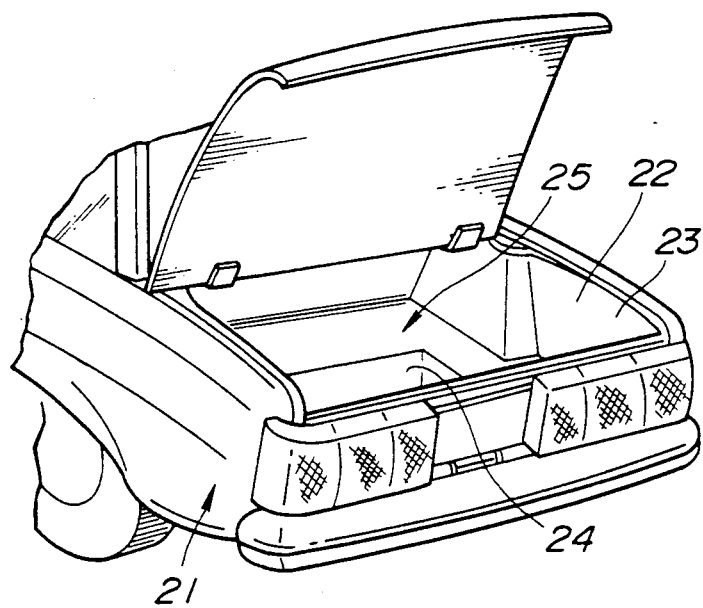
FIG. 2 is a perspective view of an automotive vehicle having a luggage compartment of FIG. 1.
Figure 3:
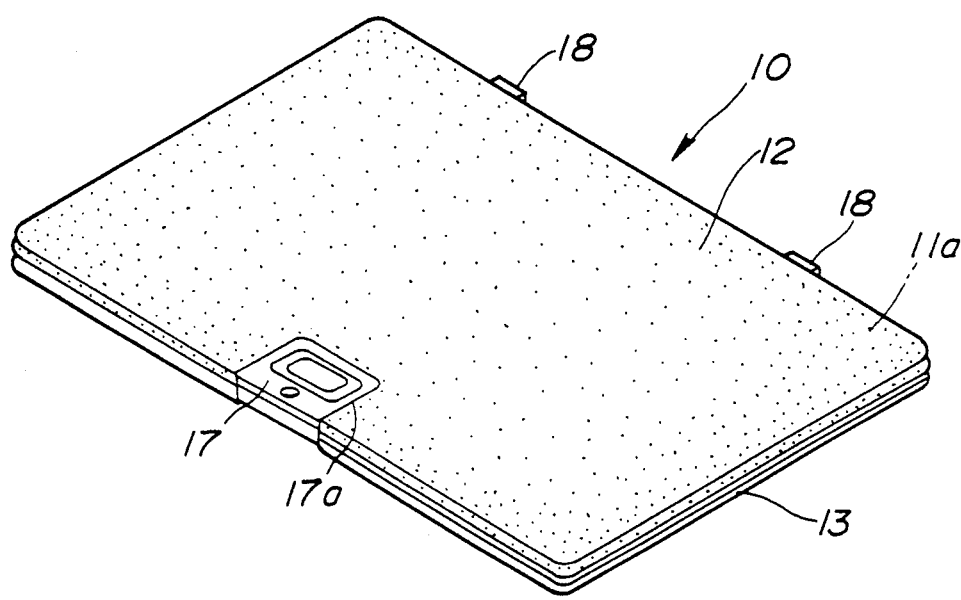
FIG. 3 is a perspective view of the partition plate of FIG. 1.

Referring now to FIGS. 1 to 7, a first embodiment of a partition plate according to the present invention is illustrated by the reference numeral 10. The partition plate 10 is used for covering a sub-space 24 formed in a luggage compartment 22 of an automotive vehicle 21. The sub-space 24 is located under a main space 23 of the luggage compartment 22 and stores a spare tire and the like therein though not shown. The partition plate 10 is of a generally rectangular shape and comprises a board 11 which has such a size as to be fitted with an entrance section 24a of the sub-space 24. The board 11 is formed of a molded plastic member and has a hollow space 11d therein.

The board 11 includes a top surface 11a, a reverse surface 11c and a side peripheral surface 11b. The top and reverse surfaces 11a, 11c are parallel with each other, forming the hollow space 11d therebetween. The side peripheral surface 11b is integral with the edges of the right and reverse surfaces 11a, 11c so as to sealingly surround the hollow 11d. The side peripheral surface 11b has a first side surface 14 and a second side surface 15. The first side surface 14 perpendicularly extends and is contiguous to the reverse surface 11c through their end portions. The other end portion of the first side surface 14 is contiguous to an end portion of the second side surface 15 through a horizontal surface 16. The second side surface 15 perpendicularly extends and is contiguous to the right surface 11a at their end portions. Thus, the first side surface 14 and the horizontal surface 16 define a peripheral depression (no numeral) which extends throughout the whole periphery of the board 11. The first side surface 14 has a plurality of protruding parts 14a which have through-holes 14b. The right surface 11a is covered with a carpet 12 serving as a trim member. A peripheral section 12b of the carpet 12 extends to and covers the first side surface 14.

The board 11 is formed with a recess 17a at a middle part of its front side end. A locking device 17 is provided in the recess 17a to be generally flush with the surfaces 11a and 11c of the board 11. A pair of connecting members 18 are outwardly projected from the side peripheral surface 11b of an opposite side to the recess 16a of the board 11. With this arrangement, the partition plate 10 fits a section 25a of the luggage floor 25 defining the entrance section 24a of the sub-space 24 in a manner that the connecting members 18 are inserted into holes (not shown) formed at the section 25a while the locking device 17 is engageable with a projection 29 formed on the section 25a.

The carpet 12 is made of the same materials as that of a floor carpet 25c of the luggage floor 25. The carpet 12 is cut in a suitable size so as to cover the right surface 11a and the second side surface 15. The carpet 12 has a cutout so that the locking device 17 is not covered with the carpet 12 when the carpet 12 is fixedly fitted on the right surface 11 with adhesive or the like.

Figure 4:
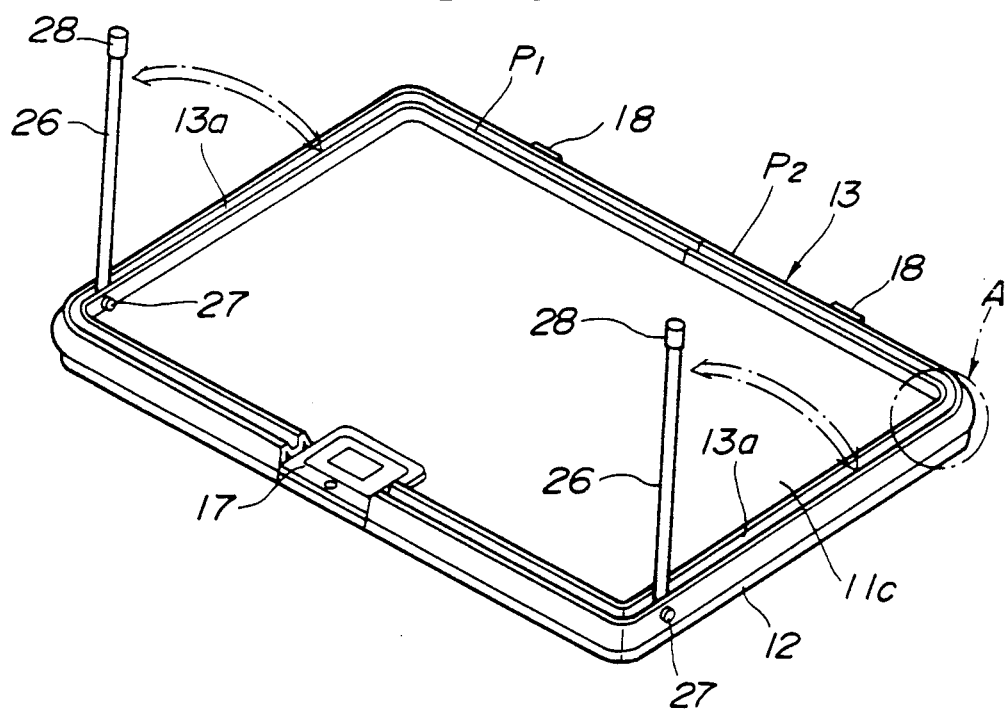
FIG. 4 is another perspective view of the partition plate as viewed from the opposite direction of FIG. 3.
Figure 5:
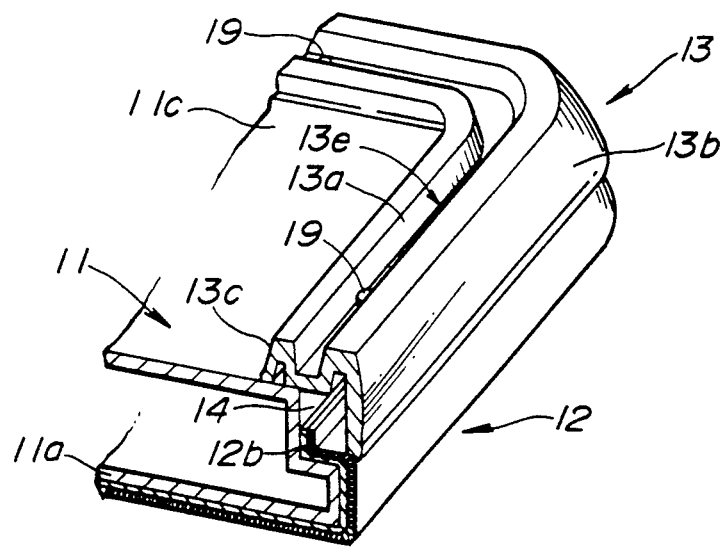
FIG. 5 is a fragmentary enlarged perspective view, partly cut in section, of the partition plate indicated by a circle A in FIG. 4.
Figure 6:
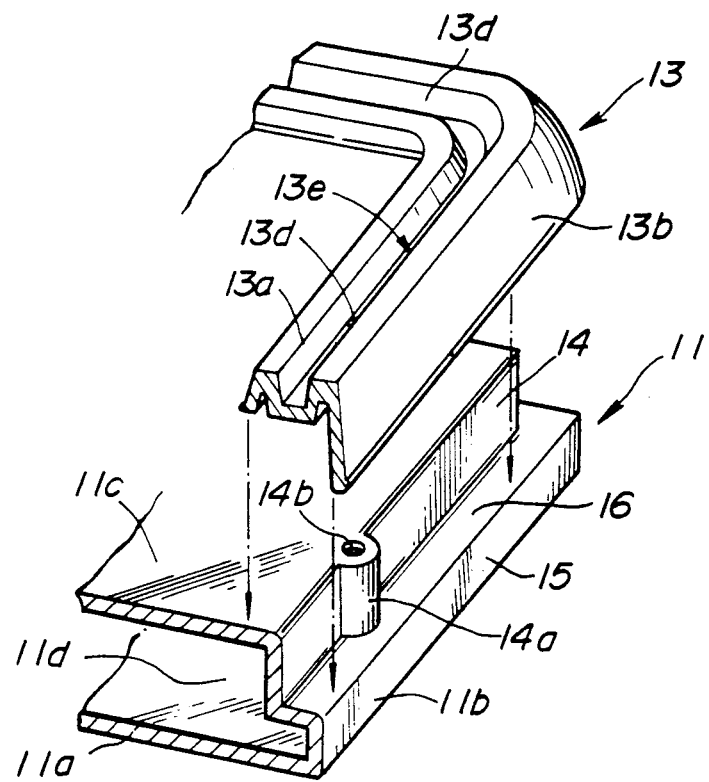
FIG. 6 is an exploded perspective view of the partition plate of FIG. 5.

As shown in FIG. 4, a garnish 13 includes two parts P₁, P₂ each of which is made of plastic and formed in a generally U-shape. The parts P₁, P₂ of the garnish 13 are installed on the board 11, in which the parts P₁, P₂ look like an integral part. As shown in FIGS. 5 and 6, the garnish 13 has an installation section 13a formed in a U-shaped cross section and defining a groove 13e. The installation section 13a is integrally connected at its outer side end with an outer wall section 13b, and at its inner side end with an inner wall section 13c. The installation section plurality of installation holes 13d which are arranged corresponding to the arrangement of the through-holes 14b. The installation section 13a is installed on a peripheral section of the reverse surface 11c so that the installation holes 13d are located just on the through-holes 14b respectively. The outer wall section 13b perpendicularly extends to the second side surface 15 to cover the peripheral section 12b of the carpet 12. The inner wall section 13c perpendicularly extends to the reverse surface 11c so that a free end of the inner wall section 13c is tightly contacted with the reverse surface 11c.

Figure 7:
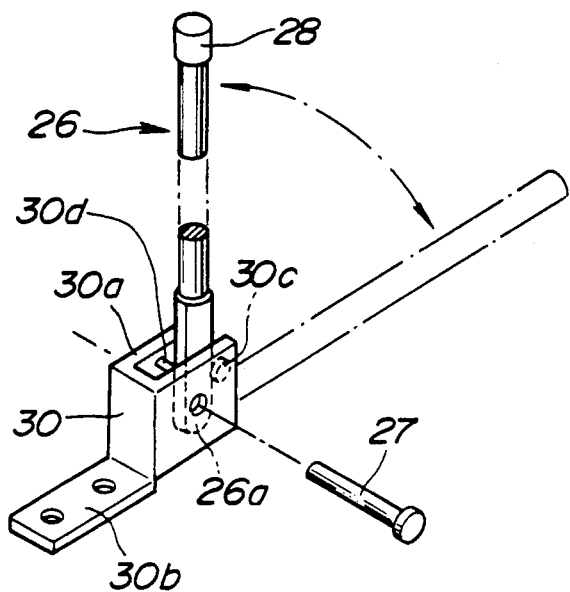
FIG. 7 is a perspective view of a connecting rod and a bracket attached to the partition plate according to the present invention.

A pair of supporting rods 26 are installed on the installation section 13a of the garnish 13 and located at two corner sections of the reverse surface 11c of the board 11 as shown in FIG. 4. Each of supporting rod 26 has an end section 26a forming a rectangular cross-section as shown in FIG. 7. The end section 26a is pivotably supported by a connecting shaft 27 which passes through the inner and outer wall sections 13b, 13c of the garnish 13 and can be supported by a bracket 30.

The bracket 30 made of resilient materials is generally in an L-shaped form and has a vertical section 30a and a horizontal section 30b as shown in FIG. 7. The vertical section 30a having a U-shaped horizontal cross-section serves as a guide section by which the supporting rod 26 is supported. The horizontal section 30b is secured on a bottom surface of the installation section 13a with bolts (not shown) so that the bracket 30 is fixedly secured to the partition plate 10. The end section 26a of the supporting rod 26 is disposed inside the vertical section or U-shaped member 30a. Since a positioning pin 30d is formed at an inner surface of the vertical section 30a in order to support the supporting rod 26 at a vertical position, a pivotable range of the supporting rod 26 is limited between a horizontal position and a vertical position, i.e., within the range of 90° in angle. The vertical section 30a is formed at one inner surface thereof with a projection 30c used as a stopper for the supporting rod 26. The projection 30c is located at such a predetermined position so that the supporting rod 26 is fixable at a horizontal or vertical position. The vertical section 30a is resiliently deformed so that the supporting rod 26 can pass over the projection 30c. The two supporting rods 26 are installed at the two corner sections of the partition plate 10, respectively, as shown in FIG. 4. The supporting rod 26 may be installed to only one corner section of the partition plate 10. The other end of the supporting rod 26 carries an elastic cap member 28 with which the supporting rod 26 is elastically supported in the groove 13e of the installation section 13a.

Under a condition that the partition plate 10 is disposed on the upper opening step section 25a as shown in FIG. 1, when a spare tire and/or the like is removed from or put into the sub-space 24, the supporting rods 26 are adjusted in a supporting position where the supporting rods 26 are disposed generally perpendicular to the board 11. Thus, the supporting rods 26 support the partition plate 10 that the front section of the partition plate 10 is held up. In this manner, the partition plate 10 is maintained in an opened condition so that the spare tire and/or the like is easily removed from or put into the sub-space. In case that such an operation is carried out in a short time, the partition plate 10 may be supported by one supporting rod 26.

With the thus arranged partition plate 10, the spare tire and/or the like in the sub-space 24 is easily taken in and out without detaching the partition plate 10.

Additionally, the partition plate 10 has a good external appearance because of the following facts: 1) The board 11 is covered at its peripheral section with the garnish 13; 2) The supporting rods 26 are received in the groove 13e; 3) The board 11 and the garnish 13 are made of plastic. Furthermore, the partition plate 10 has the following advantages when used as a table upon being removed from the luggage compartment 22: When the partition plate 10 is used so that the surface of the carpet 12 is located on the upper side of the board 11, the plate can be stably placed on the ground and the like without making the carpet dirty. When the partition plate 10 is used in a manner such that the surface of the carpet 12 is located at a lower side of the board 11, the carpet 12 serves as a stopper to prevent the table from moving in the horizontal direction.

Figure 8:
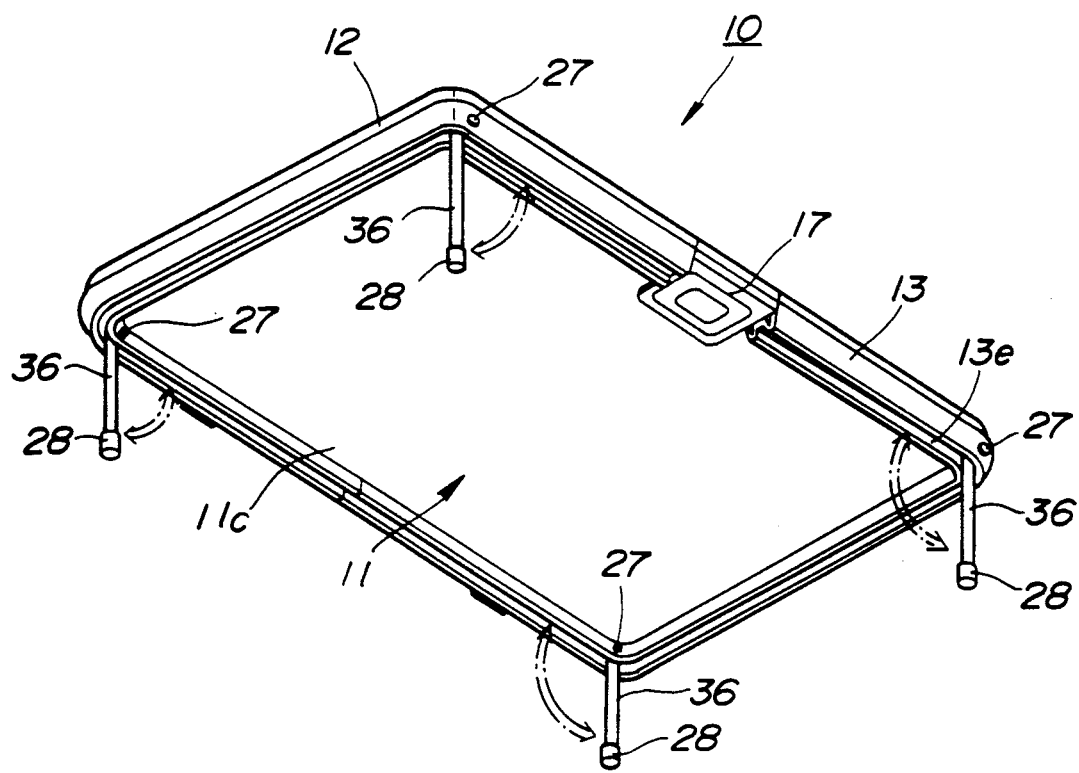
FIG. 8 is a perspective view of a second embodiment of a partition plate having four connecting rods,, according to the present invention.
Figure 9:
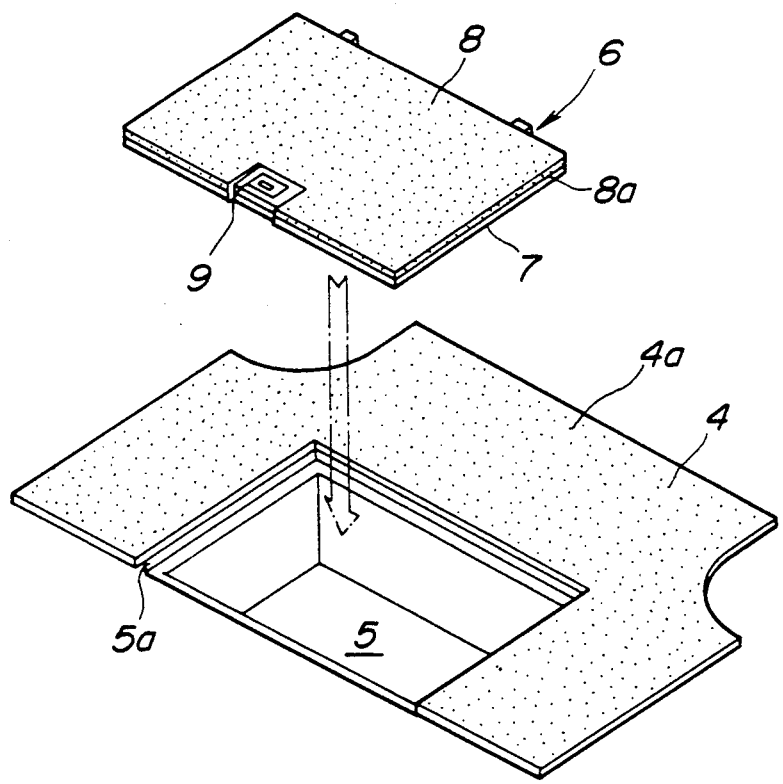
FIG. 9 is a perspective view of a conventional partition plate and a luggage floor.

FIG. 8 illustrates a second embodiment of the partition plate 10 according to the present invention, which is similar to the first embodiment of FIGS. 1 to 7. In this embodiment, four supporting rods 36 are installed to the partition plate 10 at the corners of the garnish 13 so that the connecting ends 36a of the supporting rods 36 are pivotally secured in a manner similar to that of the first embodiment. When the partition plate 10 is used as a table in the outdoors upon being removed from the luggage compartment 22 and in a manner such that the carpet 12 is located at an upper side of the board 11, the partition plate 10 serves as a table having legs because the supporting rods 36 are set at standing positions.

While only two embodiments have been shown and described, it will be understood that the present invention is not limited to these embodiments and that various modifications and improvements can be applied to this invention. It will be appreciated that the partition plate 10 may be used as a tonneau board with which a passenger room and a luggage compartment are divided. Furthermore, the locking device 17 may have various structures according to various uses of the partition plate.

What is claimed is:

1. A partition plate for use in a vehicle, comprising:
a board having first and second surfaces which are opposite to each other;
a trim member secured to said board first surface;
a garnish secured to said board second surface, said garnish covering a peripheral section of said trim member, said garnish having a section defining a groove; and
at least one supporting rod having a first end pivotally connected to said groove defining section of said garnish, said supporting rod being retractable in said garnish groove.

2. A partition plate as claimed in claim 1, wherein said board has a side peripheral surface through which said first and second surfaces are connected, and wherein a peripheral section of said trim member extends to said side peripheral surface.

3. A partition plate as claimed in claim 1, wherein said at least one supporting rod includes at least two supporting rods by which said board is supported when said board is kept under a condition that said partition plate is moved to open a sub-space in the luggage compartment.

4. A partition plate as claimed in claim 3, wherein said at least two supporting rods include four supporting rods.

5. A partition plate as claimed in claim 1, wherein said supporting rod is connected to said garnish through a bracket.

6. A partition plate as claimed in claim 3, wherein said at least two supporting rods are installed to two corner sections of said board second surface.

7. A partition plate as claimed in claim 1, wherein said board has a hollow space which is located between said first and second surfaces, said side peripheral surface sealingly surrounding said hollow space.

8. A partition plate as claimed in claim 1, wherein said board is made of plastic.

9. A partition plate as claimed in claim 1, further comprising a locking device with which said partition plate is fixed on a floor of said luggage compartment.

10. A partition plate as claimed in claim 1, wherein said garnish includes two parts made of plastic.

11. A partition plate as claimed in claim 1, wherein said partition plate is detachable from the luggage compartment for use as a table.

12. A partition plate for use in a vehicle, comprising:
a board having first and second surfaces which are opposite to each other;
a trim member secured to said board first surface;
a garnish secured to said board second surface, said garnish covering a peripheral section of said trim member, said garnish having a section defining a groove;
at least one supporting rod having a first end pivotally connected to said groove defining section of said garnish, said supporting rod being retractable in said garnish groove;
wherein, said garnish has an installation section at which said garnish is secured to said board, an inner wall section which is integral with said installation section and located inside said installation section, said inner wall section extending to be contacted with said board second surface and an outer wall section which is integral with said installation section and located outside said installation section, said outer wall section extending to said board side peripheral surface and covering the peripheral section of said trim member.

13. A partition plate for use in a vehicle, comprising:
a board having first and second surfaces which are opposite to each other;
a trim member secured to said board first surface;
a garnish secured to said board second surface, said garnish covering a peripheral section of said trim member, said garnish having a section defining a groove; and
at least one supporting rod having a first end pivotally connected to said groove defining section of said garnish through a bracket, said supporting rod being retractable in said garnish groove, said bracket having a vertical section to which the supporting rod is supported, and a horizontal section with which said bracket is secured in said garnish groove.

14. A partition plate for use in a vehicle, comprising:
a board having first and second surfaces which are opposite to each other;
a trim member secured to said board first surface;
a garnish secured to said board second surface, said garnish covering a peripheral section of said trim member, said garnish having a section defining a groove; and
at least one supporting rod having a first end pivotally connected to said groove defining section of said garnish, said supporting rod being retractable in said garnish groove, said supporting rod having a second end which carries an elastic cap member with which the supporting rod is elastically supported in said garnish groove.

15. A partition plate for use in a vehicle, comprising:
a board having first and second surfaces which are opposite to each other, said board having a side peripheral surface through which said first and second board surfaces are connected, said board side peripheral surface having first and second peripheral side surfaces that are connected through a peripheral horizontal surface parallel with said board first and second surfaces;
a trim member secured to said board first surface, a peripheral section of said trim member extending to said side peripheral surface;
a garnish secured to said board second surface, said garnish covering a peripheral section of said trim member, said garnish having a section defining a groove; and
at least one supporting rod having a first end pivotally connected to said groove defining section of said garnish, said supporting rod being retractable in said garnish groove.

16. A partition plate as claimed in claim 15, wherein a free end of said inner wall section of said garnish is contacted with said second surface, and a free end of said outer wall section of said garnish is contacted with said first side surface of said side peripheral surface.

17. A partition plate as claimed in claim 15, wherein said first side surface of said side peripheral surface has a plurality of protruding sections which have through-holes.

18. A partition plate as claimed in claim 17, wherein said installation section has a plurality of installation holes, said edge member being fixedly secured on said board in a manner that said installation holes and said through-holes are interconnected with connecting members.

19. A partition plate for use in a vehicle, comprising:
a board having first and second surfaces which are opposite to each other;
a trim member secured to said board first surface;
a garnish secured to said board second surface, said garnish covering a peripheral section of said trim member, said garnish having a section defining a groove; and
at least one supporting rod having a first end pivotally connected to said groove defining section of said garnish through a bracket, said supporting rod being retractable in said garnish groove, wherein said bracket has a projection used as a stopper for said supporting rod.

20. A partition plate as claimed in claim 19, wherein said projection is located in a predetermined position so that said supporting rod is set at a vertical state.

21. A partition plate as claimed in claim 20, wherein said supporting rod is passable of said projection.

* * * * *